W. A. BUTLER.
MANUFACTURE OF GAS-FITTERS' HOOKS.

No. 178,729. Patented June 13, 1876.

Witnesses
John Becker
Fred. Haynes

Wm. A. Butler
by his Attorneys
Brown & Allen

UNITED STATES PATENT OFFICE.

WILLIAM A. BUTLER, OF NEW YORK, N. Y.

IMPROVEMENT IN THE MANUFACTURE OF GAS-FITTERS' HOOKS.

Specification forming part of Letters Patent No. 178,729, dated June 13, 1876; application filed December 7, 1875.

*To all whom it may concern:*

Be it known that I, WILLIAM A. BUTLER, of the city, county, and State of New York, have invented a new and useful Improvement in the Art of Manufacturing Pipe-Hooks; and I do hereby declare that the following is a full, clear, and exact description thereof, reference being had to the accompanying drawings, which form part of this specification.

Pipe-hooks for plumbers and gas-fitters have heretofore been made by hand-forging from rod-iron or wire, by drawing out the shank in taper form, reducing and flattening the portion which is to form the bend of the hook, and hammering out the intermediate portion to form the head or shoulder upon which the hammer is to strike in driving the hook into its place, and afterward forming the bend. This is a tedious process, and the hook so manufactured is rough and more or less imperfect, being more especially liable to the defect of not presenting a good square head for driving.

The object of this invention is to manufacture these hooks by machinery at less cost, and also to produce a more perfect article; and to this end it consists in first producing, in a rolling-mill with rollers of suitable shape, a plate of any suitable length, of a width equal to the length of the hook-blank, and of a transverse sectional form, corresponding with the form of the side longitudinal profile of the unbent hook-blank; then cutting the said plate transversely into strips of a thickness equal to that of the width of the hooks, and afterward forming the bends to complete the hooks.

Figure 1:
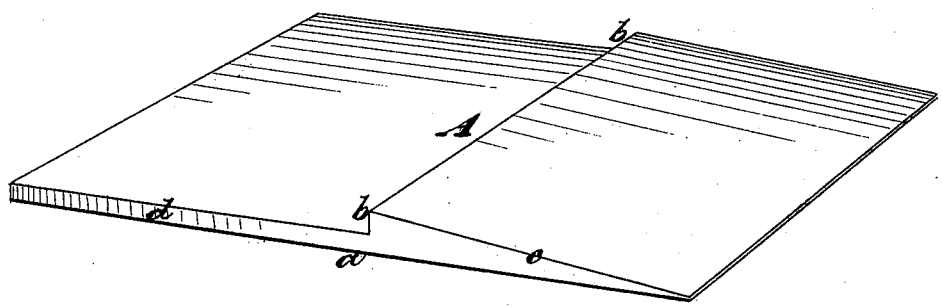
Figure 2:
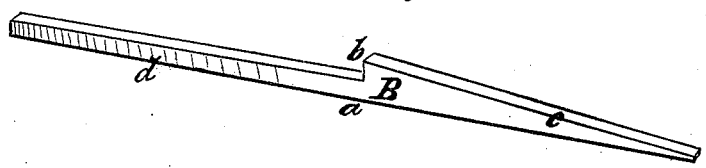
Figure 3:
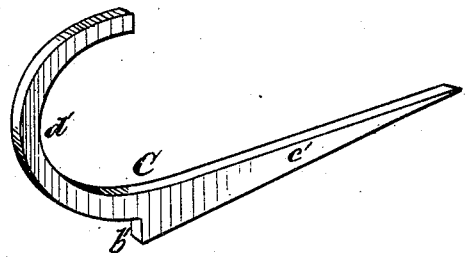

In the accompanying drawing, Figure 1 is a perspective view of the rolled plate from which the hook-blanks are to be cut. Fig. 2 is a perspective view of one of the blanks, and Fig. 3 is a perspective view of a finished hook.

Similar letters of reference indicate corresponding parts in the several figures.

The plate A, from which the hook-blanks are to be cut, is rolled with one side, *a*, flat. Its other side is rolled with an angular shoulder, *b*, running lengthwise near the middle of its width. From the outer angle of this shoulder to one edge of the plate the plate is tapered laterally, as shown at *c*, to form the shank and point of the hook, and from the inner angle of the shoulder to the other edge the plate is flat and of a uniform, or nearly uniform thickness, as shown at *d* proper, to form the bent part of the hook. The plate thus formed presents a transverse section, corresponding with the side profile of the hook-blank. This plate is cut transversely by a shearing-machine of suitable construction into parallel strips of a thickness equal to the desired width of the hook-blanks, and these strips form the hook-blanks B, one of which is shown in Fig. 2.

The blanks thus formed have the part *d*, which is to form the bend *d'* of the hook C, (shown in Fig. 3,) bent into the requisite shape by means of suitable bending mechanism, and the hook is then complete.

Pipe-hooks thus formed are better in many particulars than those forged by hand from rod-iron or wire, more especially in their heads *b'*, which are formed from the shoulder *b* of the plate and blank, these heads presenting a flat, well-defined, and solid face to the hammer when being driven into a wall; and when made by suitable machinery such hooks can be produced at a very greatly reduced cost as compared with the cost of the forged pipe-hooks.

What I claim as my invention is—

An improvement in the art of manufacturing pipe-hooks, consisting in, first, rolling out a plate to a transverse sectional form corresponding with the side profile of an unbent hook-blank, afterward cutting the said plate transversely into strips to form the blanks, and, finally, bending the cut blanks to form the bends of the hooks, all substantially as herein described.

WM. A. BUTLER.

Witnesses:
BENJAMIN W. HOFFMAN,
HENRY T. BROWN.